United States Patent
Young et al.

(10) Patent No.: US 8,026,863 B2
(45) Date of Patent: Sep. 27, 2011

(54) TRANSMIT/RECEIVE MODULE COMMUNICATION AND CONTROL ARCHITECHTURE FOR ACTIVE ARRAY

(75) Inventors: Richard D. Young, Lawndale, CA (US); Clifton Quan, Arcadia, CA (US); Mark S. Hauhe, Hermosa Beach, CA (US); Mark E. Stading, Hermosa Beach, CA (US); Chaim Warzman, Torrance, CA (US); Adam C. Von, San Gabriel, CA (US)

(73) Assignee: Raytheon Company, Waltham, MA (US)

(*) Notice: Subject to any disclaimer, the term of this patent is extended or adjusted under 35 U.S.C. 154(b) by 371 days.

(21) Appl. No.: 12/381,867

(22) Filed: Mar. 17, 2009

(65) Prior Publication Data

US 2010/0073233 A1    Mar. 25, 2010

Related U.S. Application Data

(63) Continuation-in-part of application No. 11/545,841, filed on Oct. 11, 2006, now Pat. No. 7,525,498.

(51) Int. Cl.
 *H01Q 21/00* (2006.01)
(52) U.S. Cl. ......... 343/853; 343/753; 343/876; 342/373
(58) Field of Classification Search .................. 343/705, 343/753, 756, 757, 853, 876; 342/373, 374
See application file for complete search history.

(56) References Cited

U.S. PATENT DOCUMENTS

| | | | |
|---|---|---|---|
| 3,460,145 A | * | 8/1969 | Johnson ................. 342/371 |
| 4,990,926 A | | 2/1991 | Otsuka et al. |
| 5,079,557 A | | 1/1992 | Hopwood et al. |
| 5,166,864 A | | 11/1992 | Chitwood et al. |

(Continued)

FOREIGN PATENT DOCUMENTS

| | | |
|---|---|---|
| FR | 2867614 | 9/2007 |
| GB | 2 397 697 A | 7/2004 |
| WO | WO 02/19469 A | 3/2002 |

OTHER PUBLICATIONS

Microwave and Optical Technology Letters, vol. 49, No. 1, Jan. 2007, "Microstrip-Fed Slot Antennas Backed by a Very Thin Cavity," Vallecchi, et al., pp. 247-250.

(Continued)

*Primary Examiner* — David G Phan
(74) *Attorney, Agent, or Firm* — Christie, Parker & Hale, LLP

(57) ABSTRACT

A distributed control system for an active array antenna system is disclosed. In an exemplary embodiment, the array system employs many transmit/receive (T/R) modules each with an associated radiator element, a phase shifter element and a set of RF switch elements to set the module to transmit or receive modes. The array system is arranged to generate a transmit or receive array beam. The distributed control system in an exemplary embodiment includes an array processor for controlling the array, the processor configured to generate command signals to set the T/R module elements to transmit or receive mode and to steer the array beam to a desired direction. The command signals to steer the array beam include phase slopes common to all T/R modules in a given array or subarray. Each T/R module includes a beam steering control function configured to convert the phase slope data to phase data to set the phase shifter element for that T/R module to a phase shift setting for the beam direction associated with the phase slope index data.

24 Claims, 17 Drawing Sheets

U.S. PATENT DOCUMENTS

| | | | |
|---|---|---|---|
| 5,315,480 | A | 5/1994 | Samarov et al. |
| 5,353,031 | A | 10/1994 | Rathi |
| 5,403,973 | A | 4/1995 | Santilli et al. |
| 5,631,446 | A | 5/1997 | Quan |
| 5,829,512 | A | 11/1998 | August |
| 5,936,592 | A * | 8/1999 | Ramanujam et al. ......... 343/853 |
| 7,057,563 | B2 | 6/2006 | Cox et al. |
| 7,605,767 | B2 * | 10/2009 | Lee et al. ....................... 343/705 |
| 7,742,000 | B2 * | 6/2010 | Mohamadi ............. 343/700 MS |
| 2005/0057421 | A1 * | 3/2005 | Mohamadi .................... 343/853 |
| 2005/0068249 | A1 * | 3/2005 | Toit et al. ...................... 343/876 |
| 2005/0264448 | A1 | 12/2005 | Cox et al. |
| 2007/0153481 | A1 | 7/2007 | Touzov |

OTHER PUBLICATIONS

Antenna Engineering Handbook, Henry Jasik, Editor, McGraw-Hill, 1961, Chapter 8, Slot Antennas by Judd Blass, pp. 8-1 through 8-4.

* cited by examiner

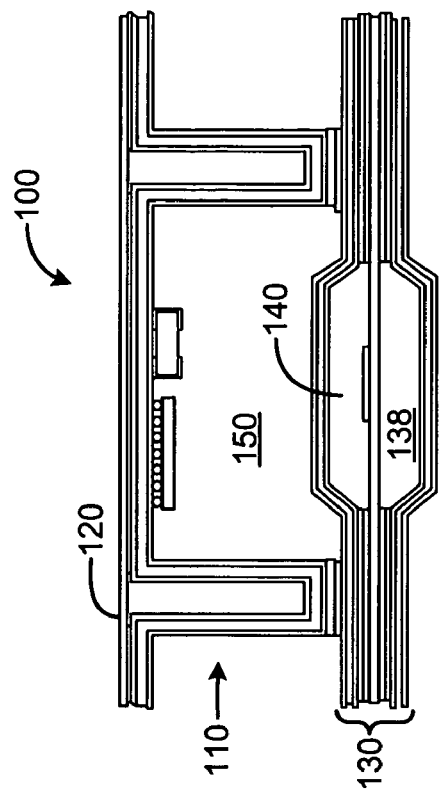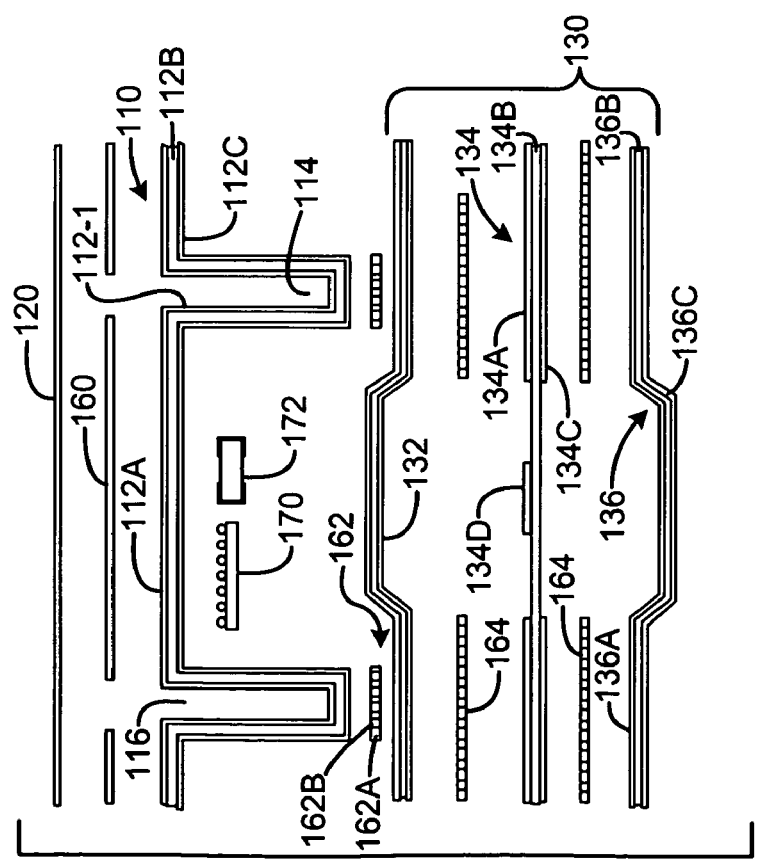

FIG. 9
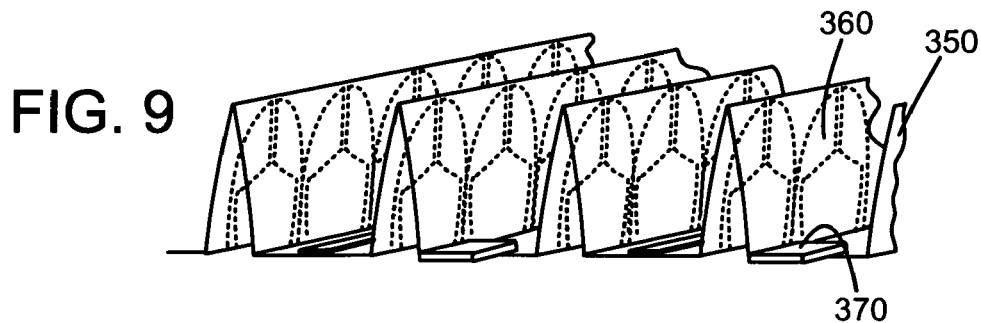
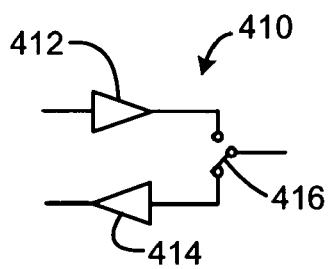
FIG. 10B
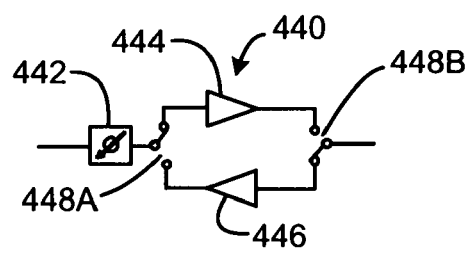
FIG. 10C
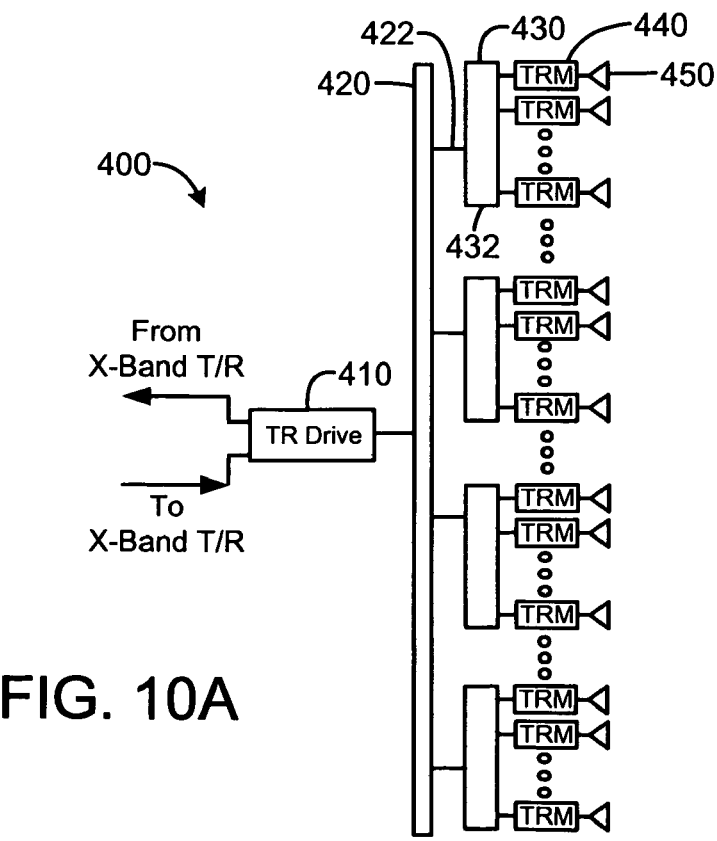
FIG. 10A

TRANSMIT/RECEIVE MODULE COMMUNICATION AND CONTROL ARCHITECHTURE FOR ACTIVE ARRAY

CROSS-REFERENCE TO RELATED APPLICATION

This application is a continuation-in-part of application Ser. No. 11/545,841, filed Oct. 11, 2006 now U.S. Pat. No. 7,525,498.

This invention was made with Government support under Contract No. FA8750-06-C-0048 awarded by the Department of the Air Force. The Government has certain rights in this invention.

BACKGROUND

Next generation large area multifunction active arrays for such exemplary applications as space and airborne based antennas for radar and communication systems, including platforms such as micro-satellites and stratospheric airships, may be lighter weight, lower cost and more conformal than what can be achieved with current active array architecture and multilayer active panel array development.

SUMMARY OF THE DISCLOSURE

A distributed control system for an active array antenna system is disclosed. In an exemplary embodiment, the array system employs many transmit/receive (T/R) modules each with an associated radiator element, a phase shifter element and a set of RF switch elements to set the module to transmit or receive modes. The array system is arranged to generate a transmit or receive array beam. The distributed control system in an exemplary embodiment includes an array processor for controlling the array, the processor configured to generate command signals to set the T/R module elements to transmit or receive mode and to steer the array beam to a desired direction. The command signals to steer the array beam include phase slopes common to all T/R modules in a given array or subarray. Each T/R module includes a beam steering control function configured to convert the phase slope data to phase data to set the phase shifter element for that T/R module to a phase shift setting for the beam direction associated with the phase slope index data.

BRIEF DESCRIPTION OF THE DRAWINGS

Features and advantages of the disclosure will readily be appreciated by persons skilled in the art from the following detailed description when read in conjunction with the drawing wherein:

FIG. 2A is an end view of the array of FIG. 2. FIG. 2B is an exploded diagrammatic end view of the array portion of FIG. 2A.

FIG. 9 is an isometric view of an exemplary embodiment of a folded flexible circuit board employing flared dipole radiators.

FIGS. 10A-10C are schematic block diagrams illustrating features of an exemplary embodiment of an active array subpanel RF circuit.

DETAILED DESCRIPTION

Figure 1:
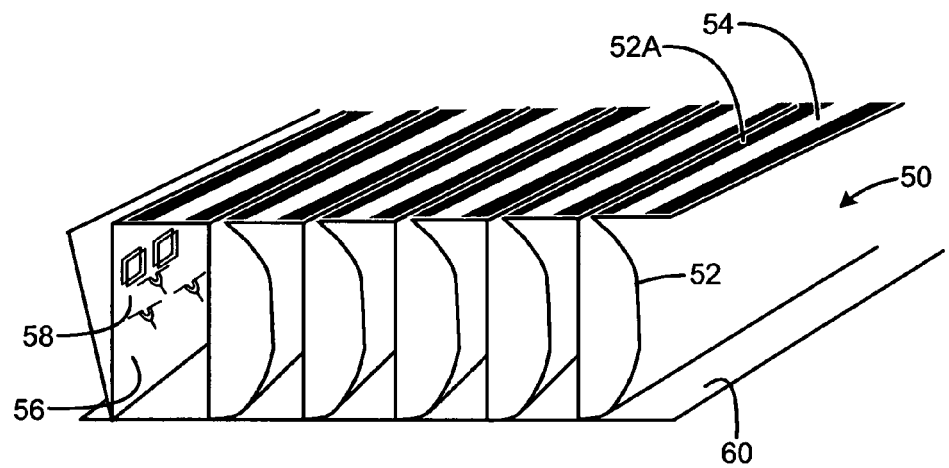
FIG. 1 is an isometric view illustrating an array architecture employing a subarray formed by a folded continuous roll or sheet of a flexible circuit board.

In the following detailed description and in the several figures of the drawing, like elements are identified with like reference numerals. The figures are not to scale, and relative feature sizes may be exaggerated for illustrative purposes.

An exemplary embodiment of an array antenna architecture may employ radiators, e.g. long slot radiators, formed by folding a thin conductor cladded RF flexible circuit laminate sheet, resulting in a pleated, origami-like appearance, which may sometimes be referred to as an "origami" assembly or origami panel array. The control signals, DC power and RF feed circuit traces may be formed or deposited on this single core laminate sheet together with T/R (transmit/receive) MMICs (monolithic microwave integrated circuits). In an exemplary embodiment, the integrated flexible circuit radiator laminate sheet may be joined to a second layer of flexible circuit laminate containing a second feed layer, e.g., in a non-limiting example, an air stripline feed. In an exemplary embodiment, vertical interconnects are not employed within the folded flexible circuit radiator laminate sheet, significantly reducing the production cost of the array. A non-limiting exemplary embodiment of an array may be about 1 cm thick with a weight of 1.2 kg per square meter. The shape of the flexible circuit may be selected to create the radiator within the fold and on the opposite side of the manifold circuitry, so that the two are shielded from each other. This construction may be fabricated as a single aperture or broken up into subarray panels.

An exemplary non-limiting embodiment of an array antenna integrates the radiator, an RF level one feed network, control signals, and DC power manifold with a single layer of flexible circuit board. In an exemplary embodiment, the assembly may be fabricated without a single conductive via through the layer. FIG. 1 is an isometric view of an exemplary embodiment illustrating an array 50. The array is fabricated using origami-like folding of the flexible circuit board 52 to effectively increase the area to route all the RF, signal, and power lines onto a single layer, without increasing the array lattice area or using any vias within the RF flexible circuit board.

In the exemplary embodiment of FIG. 1, the flexible circuit board 52 is fabricated of a flexible dielectric layer having a layer of conductive material, e.g. aluminum or copper formed on the outer surface. The flexible dielectric layer may be, for example, polyimide, polyethylene, liquid crystal polymer (LCP), Teflon® based substrates, or any organic substrate material of thickness from 5 micro-inches to 5000 micro-inches. The flexible dielectric layer may be, in exemplary embodiments, either in sheet format of up to 36 inches by 36 inches or in roll format several feet wide by 1000's of feet long. These dimensions are non-limiting, and merely given as examples. In an exemplary embodiment, the conductive layer may be selectively removed in elongated areas 54 which are parallel to the folds to form long slot radiators which are positioned at the top of each fold of the origami array 50. Positioned on the opposite surface 56 of the flexible circuit board 52 are RF circuitry, signal lines, and power lines, generally depicted by reference 58 in FIG. 1, for the array. A second circuit board 60 may be attached to the folded circuit board 52 to provide additional circuitry, e.g. for a second level feed network, e.g. a row feed network, in an exemplary embodiment. The board 60 may be flexible or rigid, and may be adhesively attached in an exemplary embodiment.

Figure 2:
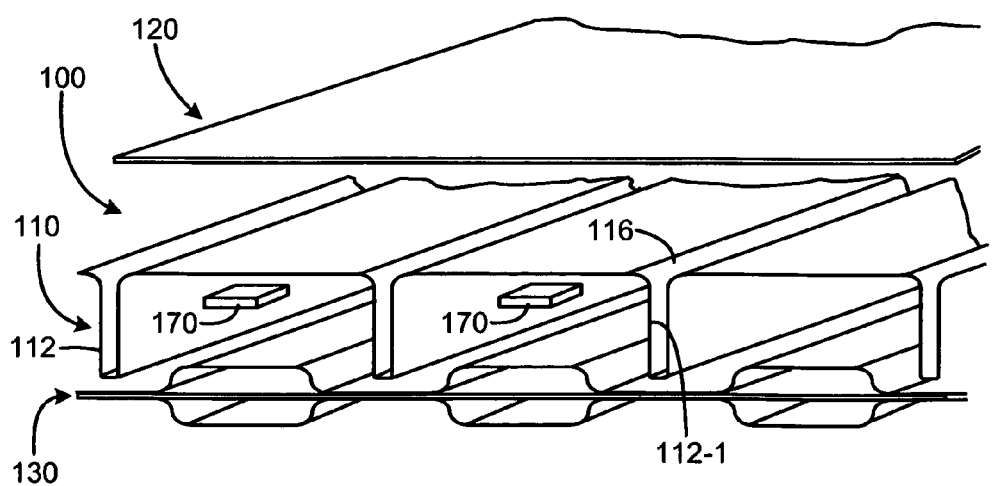
FIG. 2 is an isometric exploded view of elements of an exemplary embodiment of a lightweight array panel.

In an exemplary, non-limiting embodiment, the shape of the origami folds within the RF flexible circuit, e.g. as shown in the exemplary embodiment of FIG. 2, may be that of a cavity backed long slot radiator. This results in having a radiating aperture and the distribution manifolds shielded from each other. TR module chips and capacitors may be mounted onto the three-dimensional (3-D) folded RF flexible circuit using methods such as, by way of non-limiting examples, epoxy or solder attachment of integrated circuits or packaged surface mount components, electrically connected by wired bond or flip chip attachment. The 3-D folding of the RF flexible circuit may enable the incorporation of additional physical features such as enhanced structure support, conformality to two-dimensional (2-D) and 3-D surfaces, and allowance of physical expansion and contraction due to stresses applied to the array during deployment or operation. The integration of functionality for the RF, control and power distribution may eliminate the need for several layers of circuit boards, adhesive bonding films and hundreds of thousands of plated via as typically employed in a multilayer PCB. The result is a simplified construction of an active array panel that is light in weight.

Additional array functional and mechanical features may be incorporated onto the basic origami array or subarray by integrating additional layers of 3-D folded RF flexible circuit boards or simple flat sheets of RF flexible circuit boards.

Figure 2C:
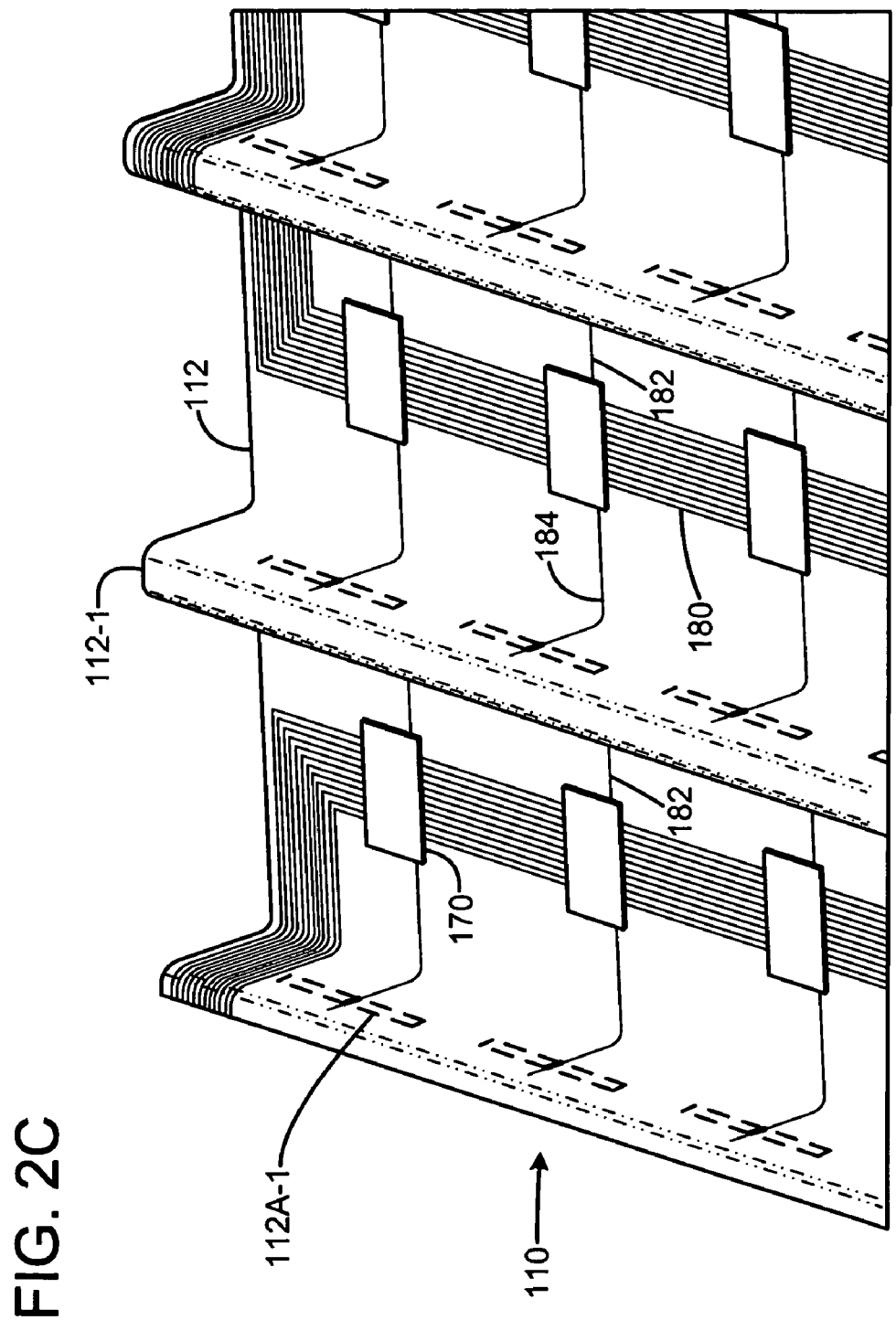
FIG. 2C is a diagrammatic isometric view, illustrating features of an exemplary embodiment of the subarray structure of FIG. 2.

FIGS. 2-2C illustrate features of an exemplary embodiment of an array 100, comprising an origami subarray 110. The subarray 110 includes a thin laminate sheet 112, which may include a flexible dielectric substrate 112B, with a conductive layer pattern 112A formed on a first, top surface of the dielectric sheet and a conductor pattern 112C formed on a second, lower surface of the dielectric substrate. The sheet 112 has a plurality of parallel folds or pleats 112-1 formed therein. The folds 112-1 define cavities 114.

Suitable techniques for forming the sheet into the origami folded structure may include as exemplary, non-limiting examples, molding using hard die tooling as in a waffle iron or through continuous folding across a mandrill or straight edge blade, sometimes with localized application of heat. Control of the shape may be dependent on the base material of the sheet. For example, in the case of LCP, the shape may be accomplished via cross linking polymers at elevated temperature in a molding process. Other materials may be "creased" to ensure proper shape outline and then through an additional polymer layer attachment, held in place much like a Venetian blind or an open cell structure as in a honeycomb.

In an exemplary embodiment, in which the radiator structures are cavity backed long slot radiators, the conductive layer pattern 112B may be a continuous ground plane layer with a set of relieved areas or windows formed therein for allowing excitation by a set of probes on the opposite side of the dielectric layer.

A single layer of RF flexible circuit board may be attached to the top of the origami subarray to form a radome 120. Exemplary radome materials may vary, from thin 0.001 inch thick polyimide to several inch thick sandwich materials made up of various polymers or esters. The radome materials may typically be chosen to reduce RF loss or to help match the radiating aperture to free space. Solar reflectors are typically polymer films such as, for example, polyesters or acrylate films, either single layered or multilayer.

The array 100 may further include, in an exemplary non-limiting embodiment, a second level manifold and face sheet structure 130, fabricated in an exemplary embodiment as a combination of three layers 132, 134, 136 (FIG. 2B) of 3-D folded/formed flexible circuit sheets to form a second level RF feed network as well as provide control signal and DC power lines. The second level structure 130 may be assembled to the origami subarray 110, and may be used in an exemplary embodiment to serve several origami subarrays in combination to form a single large area aperture assembly. For some applications, the structure 130 may not be included.

Figure 3:
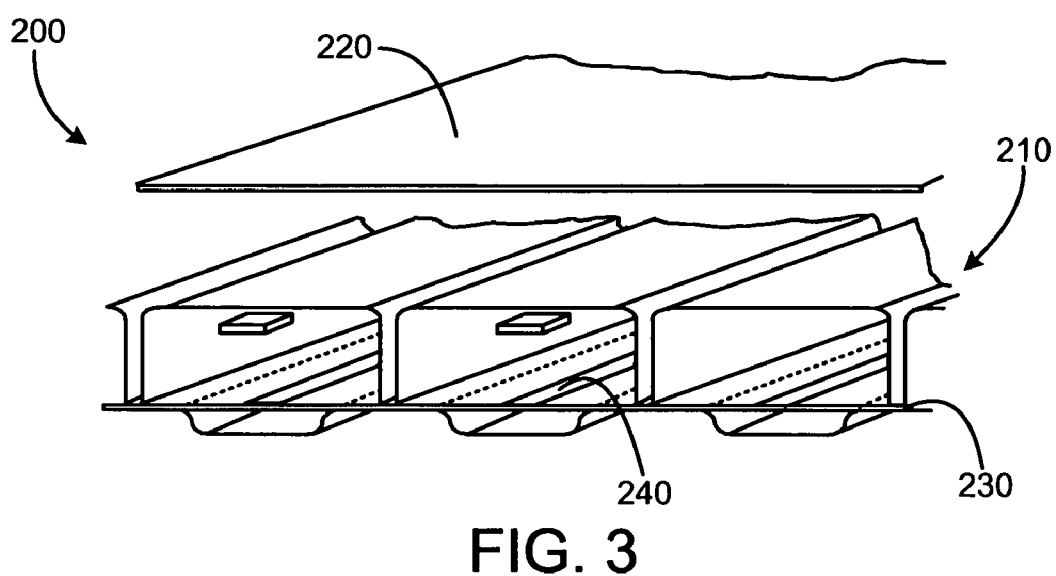
FIG. 3 is an exploded view of a portion of another exemplary embodiment of an array including a subarray formed from a continuous flexible circuit board.

In an exemplary embodiment, the second level structure 130 may utilize low loss airstripline transmission lines 140 to distribute RF signals, e.g. to the various origami subarrays. The RF flexible circuit boards 132, 136 are shaped to form metalized air channels 138 around the air stripline circuit traces. Suspended microstrip transmission lines can also be used to realize a second level RF feed, as depicted in FIG. 3. The assembly of the origami subarray 110 and the second level structure 130 forms shielded cavities/channels 150 (FIG. 2A) to reduce electromagnetic interference (EMI).

As illustrated in the exploded view of FIG. 2B, in an exemplary embodiment, attachment of radome 120 to the subarray 110, and of the subarray 110 to the second level structure 130 may be accomplished by adhesives. A structural adhesive layer 160 may be employed to attach the radome 120 to the origami subarray 110.

The origami subarray 110 may be fabricated with a flexible circuit board including a dielectric layer 110B, a groundplane layer 110A formed on an upper surface of the dielectric layer, e.g. an aluminum layer. The folding of the structure 110 creates X band long slot radiators 116 in the "creases" or folds 112-1 of the folded circuit board. The undersurface of the dielectric layer 110B has formed thereon a conductor pattern defining an RF, e.g. X band, level one feed network with signal and power line manifolds.

A structural and conductive adhesive layer 162 may be used to bond the second level feed structure 130 to the first level feed network fabricated on the origami subarray 110. The structural adhesive may be in a form of a "prepreg" layer 162A and may have holes cut in it for the placement of conductive adhesive portions 162B, to make selective electrical contacts between control signal and power lines in the structure 110 and structure 130. "Prepreg" (preimpregnation) refers to a resin based material sometimes with a mat or woven fabric used to combine layers of polymer into a monolithic structure. The conductive adhesive may be screened on after placement of the structural prepreg layer. When cured, i.e. processed by thermally accelerating the hardening of adhesive epoxies, the conductive adhesive may provide the path for both the signal and power lines. An RF connection may be obtained by capacitive coupling between two pads placed on the level one and level two feeds.

FIG. 2C illustrates a fragment of an exemplary embodiment of the subarray structure 110, showing the underside of the flexible circuit board assembly 112 having fabricated thereon conductor pattern 180 for conducting power and control signals to active devices 170 mounted on the substrate 112. The active devices may include T/R module MMIC chips, for example. The underside of the substrate also has fabricated thereon a conductor pattern 182 which forms a first level RF feed network interconnecting the active devices 170 with a second level RF feed network formed on the second level structure 130. Also fabricated on the substrate are conductor traces 184 connected to the active devices 170 and include portions which act as radiator structure probes. The conductor traces 184 pass over slots or windows 112A-1 formed in the conductive layer 112B (FIG. 2B) on the opposite surface of the structure 110. These probes 184 excite the cavities of the long slot radiators.

FIG. 3 is an isometric view of an alternate exemplary embodiment of an array architecture 200, which is similar to the array 100 of FIG. 2, except that the second level feed structure 230 employs a suspended microstrip transmission line structure 240 to realize the second level RF feed structure 230.

FIGS. 4-7 illustrate an exemplary embodiment of an interconnection of the control signal and DC power lines to transmit/receive (T/R) chips 170 mounted on the origami subarray 110. In this embodiment, the control signal and DC power lines are run serially to the TR module chips 170 along the 3-D origami subarray panel substrate 112. The signal and power lines and TR chip I/O's generally comprising manifold 180 may be orthogonal to the RF lines and I/O's of the feed network 180 that run from the first level RF feed and radiator transition to avoid cross-overs and via interconnects within the RF flexible circuit board 112. Microstrip transmission line may be used for the first level RF feed network 180, as it can be routed along the folded RF flexible circuit board 112. Because the manifold circuitry is placed along the side of the long slot radiators, there is no increase in the thickness of the antenna; for X-band the thickness of the origami panel in an exemplary non-limiting embodiment may be a little over a centimeter, exclusive of side electronics. The radiator transition may incorporate a microstrip transmission line 182 running from the TR chips 170 along the RF flexible circuit board coupling to either a slot 112A-1 located along the side of the radiator cavity or a probe 184 the runs across the top of the cavity.

Figure 4:
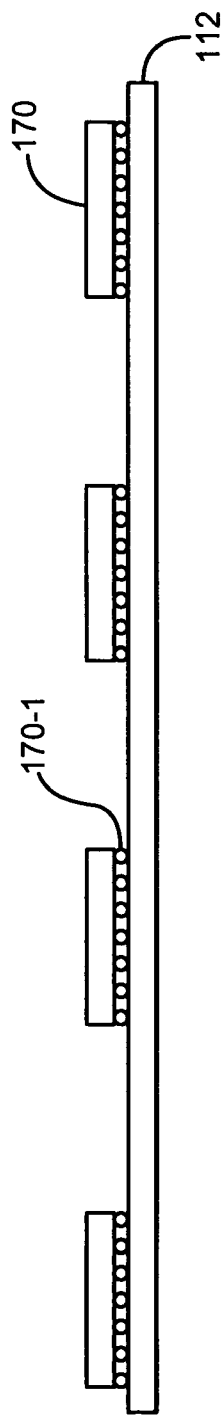
FIG. 4 is a diagrammatic side view illustrating an exemplary mounting arrangement for T/R module chips on a panel array assembly.

FIG. 4 diagrammatically depicts an exemplary embodiment of a technique for attaching RF circuit devices 170 to an array substrate 112. In this example, the devices 170 may be MMIC chips, mounted to the substrate 112 by conductor pads 170-1. These MMIC chips may provide T/R module functions, e.g. for an X-band array frequency regime.

Figure 5:
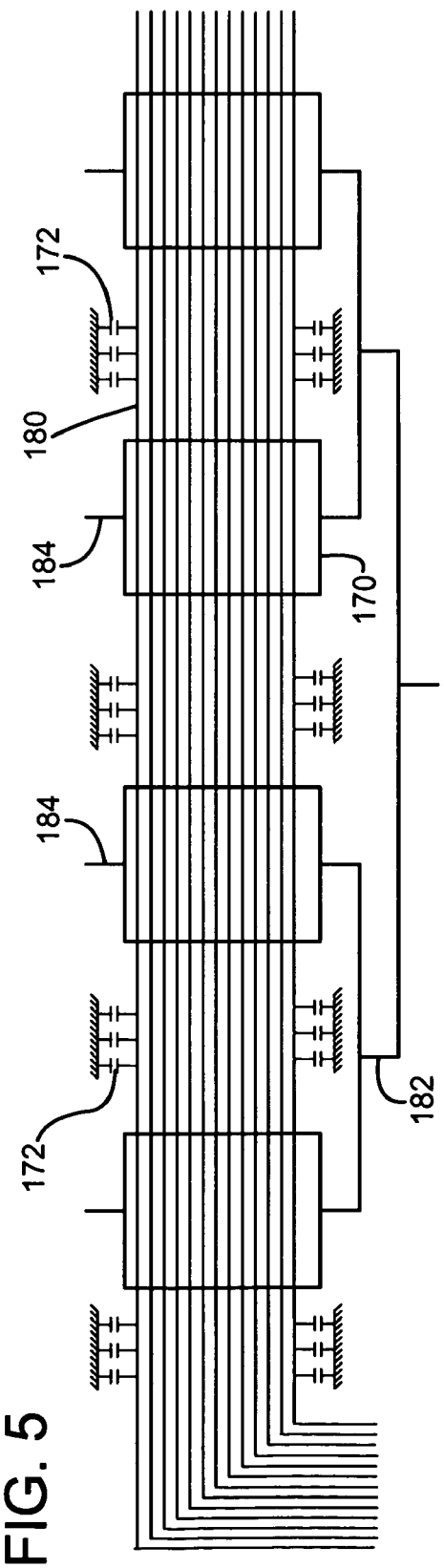
FIG. 5 is a diagrammatic schematic diagram illustrating an exemplary control signal and DC power manifold arrangement for a portion of an array assembly.

FIG. 5 is a top view depiction of an exemplary embodiment of a portion of the circuitry formed on the underside of the substrate 112 along one fold or pleat of the origami substrate structure. A conductor trace pattern defines the control signal and power manifold 180 which series connects the active devices 170 attached to the substrate 112. An RF level one feed network depicted as 182 provides RF signals to the active devices 180, with RF probe conductors 184 connected to the active devices 180.

Figure 6:
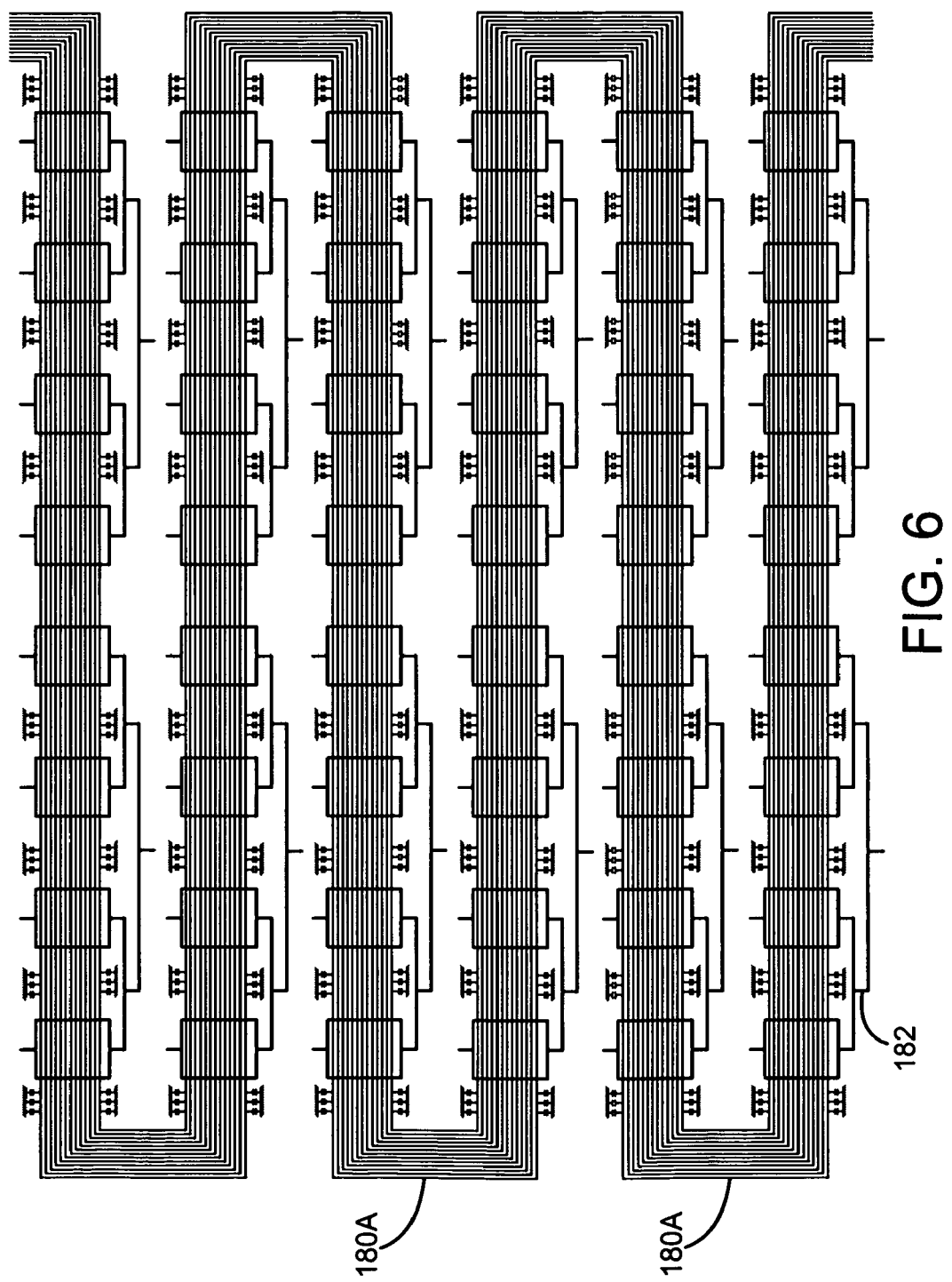
FIG. 6 is a schematic diagram of an exemplary embodiment of power and control signal lines for the T/R modules of a panel array assembly.

FIG. 6 is a top view depiction of an exemplary embodiment of a larger portion of the circuitry depicted in FIG. 5, for several adjacent folds or pleats in the substrate structure 110. The series connection of the control signal and power manifold may be extended from one column area between two adjacent folds to the next column area by passing the transverse conductor pattern portion 180A under one fold to connect to the parallel conductor pattern portions in the adjacent column areas. The level one RF feed network 182 is also depicted.

Figure 7:
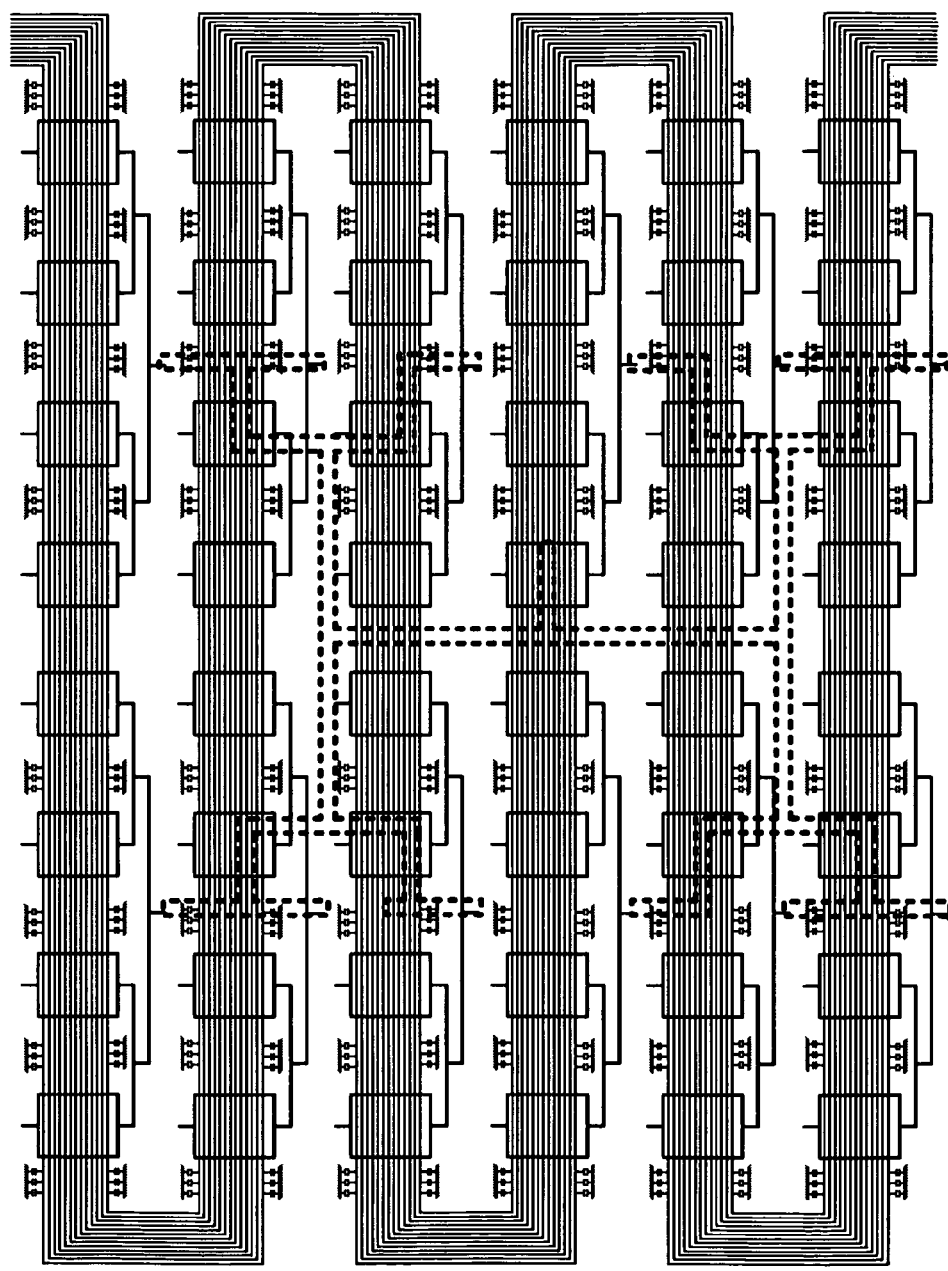
FIG. 7 is a schematic diagram similar to FIG. 6, showing an exemplary embodiment of a second level RF feed network.

FIG. 7 is a view similar to that of FIG. 6, with an exemplary embodiment of a second level RF feed network 190 depicted in dashed lines. The network 190 is fabricated on or in the second level structure 130, including the transmission line 140.

Figure 8:
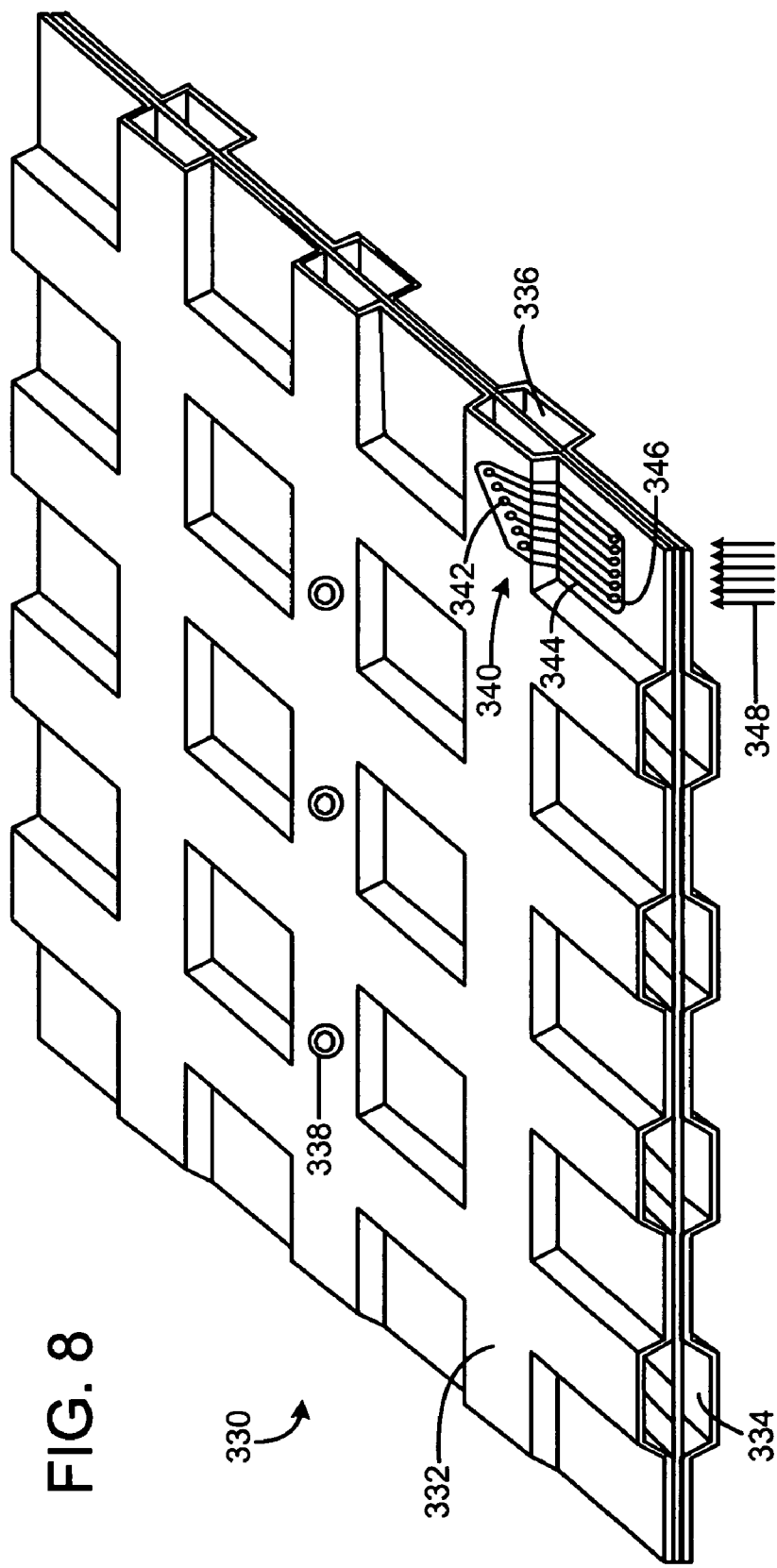
FIG. 8 is a diagrammatic isometric view of an exemplary embodiment of a base structure for an exemplary panel array assembly.

An exemplary alternative embodiment of a second level structure is depicted in FIG. 8, as structure 330. An origami panel structure such as panel 110 may be attached to the structure 330 in a manner similar to that depicted in FIG. 2, except that the folds of the panel 110 are attached to the structure 330 at the raised areas above the suspended stripline channels. The structure 330 has a "waffle" pattern facilitating fabrication of the stripline channels 334, 336 in two, transverse directions. Conductive vias 338 may be formed in the top layer of the structure 330 to provide electrical interconnection from the top surface to another layer of the structure. The structure 330 illustrates a fragment of an exemplary conductor pattern 340 which may interconnect to the conductor pattern fabricated on the matching origami subarray structure. The conductor pattern may include, for example, conductor pads 342 which electrically connect to pads in the conductor pattern of the origami subarray through z-axis conductive adhesive, for example, when the structure 330 is assembled to the subarray. The conductor pattern 340 further includes conductor lines 348 which run to a set of vias 346. Electrical connections may be made to the conductor pattern on opposite ends of the vias 346 on the underside of the structure 330. The conductor pattern may be extended or replicated as needed over areas of the structure 330.

Other types of radiators may be folded within the origami panel subarray beside the long slot radiators. FIG. 9 depicts flared dipole radiators 360 incorporated into a folded RF flexible circuit board assembly 350. T/R module chips 370 are mounted on flat surfaces of the circuit board assembly 350.

An exemplary RF architecture for an exemplary embodiment of an origami active sub-panel array is illustrated in FIGS. 10A-10C. FIG. 10A depicts an exemplary block diagram for an RF active array system 400. The system includes a transmit/receive (T/R) drive circuit 410, depicted in further detail in FIG. 10B, which is connected to an exemplary second level feed network 420 for the sub-panel array 400. The T/R drive circuit 410 receives an input drive signal from an RF exciter such as an X-band exciter, and routes received signals from the T/R modules to a receiver circuit such as an X-band receiver. The feed network 420 has I/O ports 422 connected respectively to I/O ports of the first level RF feed network 430. The first level RF feed network has I/O ports 432 which are connected in turn to the transmit/receive (T/R) module chips 440 mounted on the origami panel circuit board. The radiators 450 are connected to the T/R module chips.

FIG. 10B illustrates a schematic functional block diagram of an exemplary embodiment of a T/R drive circuit 410, which includes a power amplifier 412 for amplifying exciter signals, a low noise amplifier 414 for amplifying received signals, and a switch 416 for selecting transmit or receive channels.

FIG. 10C illustrates a schematic functional block diagram of an exemplary embodiment of a T/R module chip 440, which includes a power amplifier 446 for amplifying transmit signals from the T/R drive circuit 410, a low noise amplifier 446 for amplifying received signals from the radiator 450, and switches 448A, 448B for selecting either the transmit channel or the receive channel. The chip 440 also includes a variable phase shifter 442.

Figure 11:
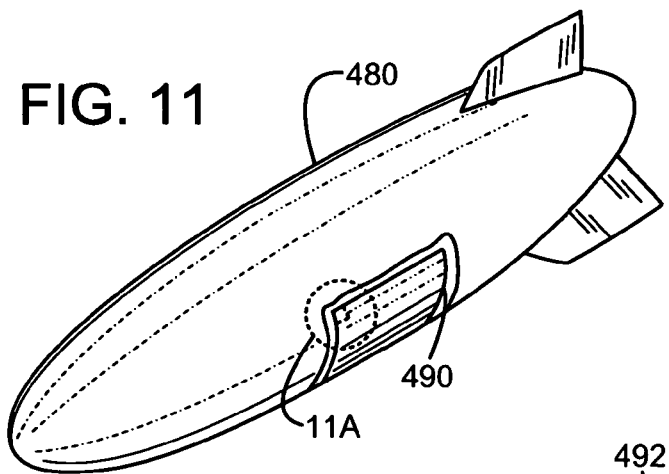
FIG. 11 is an isometric view of an airship employing an exemplary embodiment of a panel array assembly.
Figure 11A:
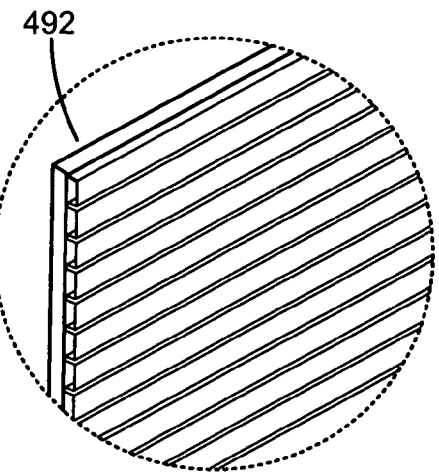
FIG. 11A is an isometric view of a portion of the panel array assembly within circle 11A of FIG. 11.

One exemplary application for an origami array antenna is the construction of a thin light weight active array antenna 490 mounted on the skin of an airship 480 as shown in FIGS. 11 and 11A. In this example the antenna may incorporate hundred of individual origami active panels 492 mounted onto the skin.

Connection of the power, signal and RF lines from the airship to the level two feed on the panels may be accomplished by use of low profile connectors. A straight, surface mount GPPO-style RF connector is both lightweight and low loss. A right angle button style fitting on the mating connector may provide a light weight yet easily routable cable solution. For the power and signal lines a standard low profile, light weight, surface mount microD connector may be used. The microD connector can be oriented as either straight or right angle to best facilitate cable routing.

Thin RF flexible circuit technologies may be employed in the fabrication of thin ultra-lightweight flexible active panel array antennas. Applying 3-D circuitry onto a folded/formed RF flexible layer may be a key enabler to integrations of both electrical and mechanical functions. This may result in a significant reduction in the number of dielectric, conductor, and adhesive layers. Also the number of interconnects may be almost eliminated and in an exemplary embodiment may be principally located in the second level RF feed.

For an exemplary airship application, communicating with a large number of individual T/R elements per panel, e.g. tens of thousands, while keeping power dissipation and interconnection to a minimum, presents a significant challenge. Because the antenna for an airship may have a large number, e.g. thousands, of panels mounted on the airship, a slave beam steering controller (BSC) may be employed to route commands from the central processor and master BSC to the TR elements on each panel. In an exemplary embodiment of a distributed control architecture, beam steering controller functionality may be implemented at each element, thus minimizing the amount of data transfer required to steer the beam. With a distributed beam steering architecture, in one exemplary embodiment, only x and y phase slopes and calibration index data, common to all elements for a given panel or sub-array, is transferred to the T/R module elements on each panel. In an exemplary embodiment, the calibration index data is a set of data which can be converted at each element on a panel to provide a set of calibration phase settings. For the exemplary application in which the array is mounted on an airship, which is not a rigid structure, from time to time there may be a need to update the calibration data for each element. To reduce power consumption at the control signal driver, a redundant low-power "fan out" architecture with a single differential pair of lines may be employed to transfer this data. After the data transfer, the differential pair may be used to control the T/R module pulsing. Upon end of the dwell, these lines revert to their data transfer mode to load the next beam's data. Integrated power converter and management circuitry may also be designed into the T/R module chip. The incorporation of this added functionality can be applied, for example, to a single chip TR module, a stacked chip TR module assembly, or a "system in a package" (SIP) TR module assembly.

Figure 12:
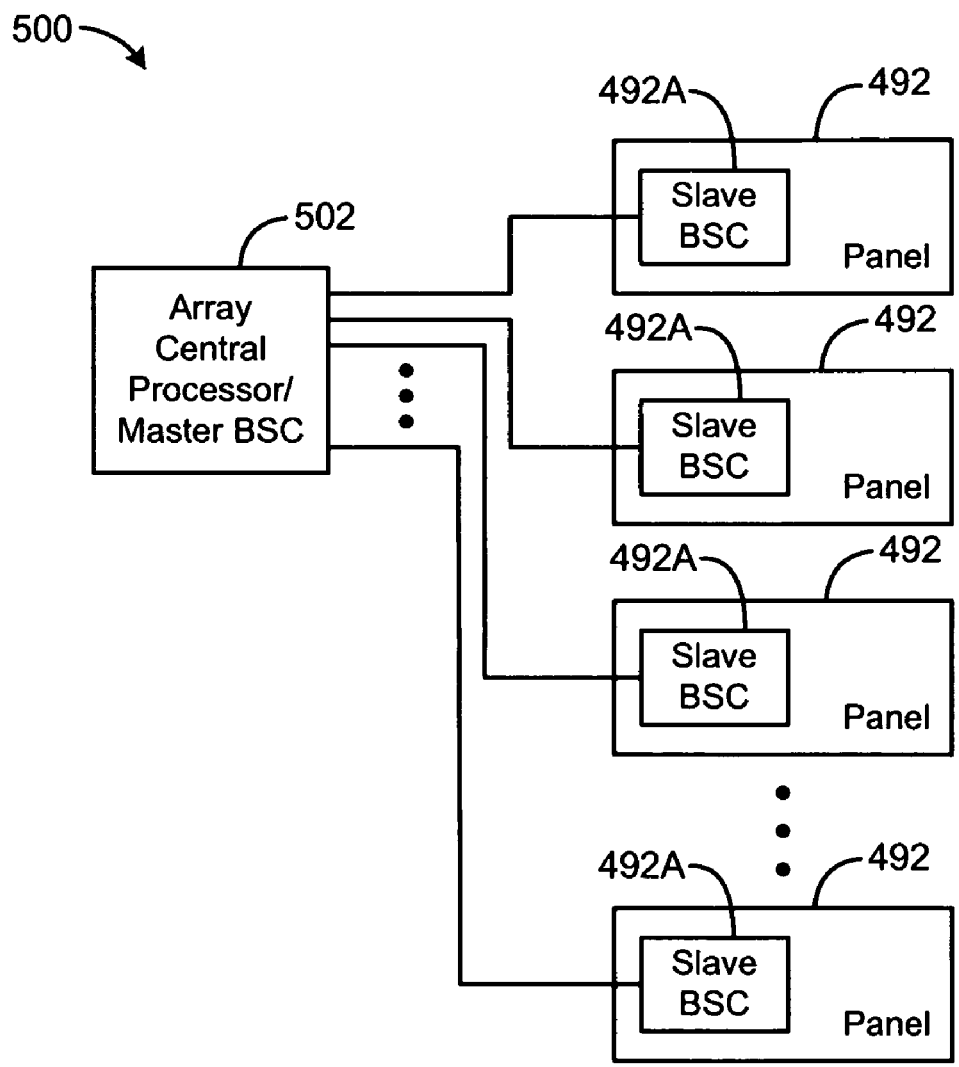
FIG. 12 illustrates in highly simplified schematic block diagram form an exemplary embodiment of a control architecture for an active array antenna system.

FIG. 12 illustrates in highly simplified schematic block diagram form an exemplary embodiment of a control architecture for an active array antenna system 500 comprising a number, typically a large number, of subarray panels 492. An array central processor and master BSC 502 controls the array system to generate array transmit and receive beams in selected beam directions. In this embodiment, each subarray panel includes a slave BSC 492A which receives beam steering control signals from the central processor, and generates control signals for the arrays of T/R modules in the subarray panel. There can be a very large number of modules per subarray panel.

Figure 12A:
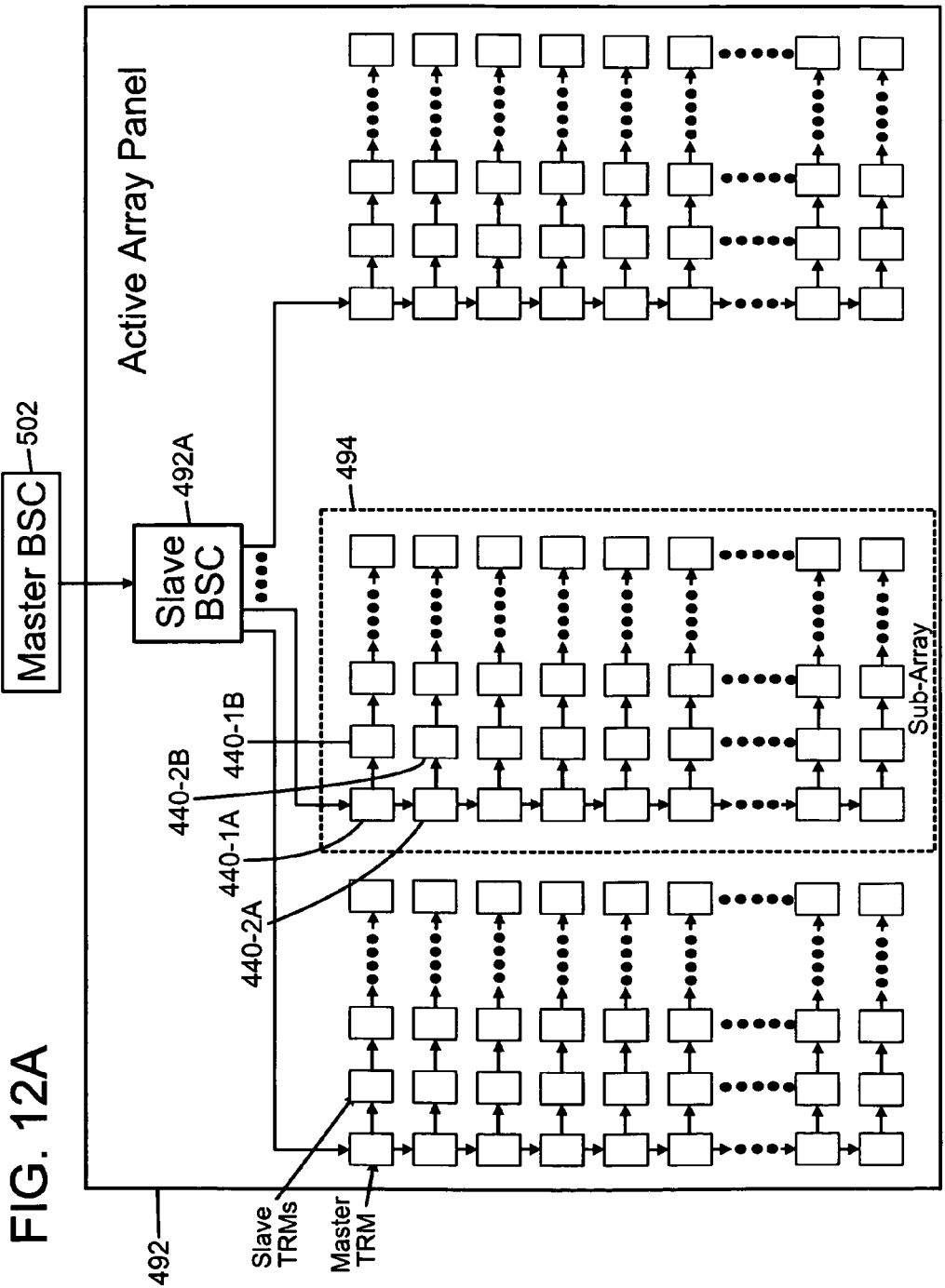
FIG. 12A is a simplified schematic block diagram illustrating an exemplary control architecture arrangement for a subarray panel of the array antenna system of FIG. 12A.

FIG. 12A illustrates, in a simplified schematic form, features of an exemplary active array panel 492, which may be replicated many times in the array system 500 of FIG. 12. As shown, the active array panel may include many subarrays, including subarray 494, and a single slave BSC which receives data and commands from the master BSC 502. In this embodiment, each subarray includes many rows of T/R module elements, each connected to a corresponding radiating element. For example, subarray 494 includes a row including T/R module elements 440-1A, 440-1B . . . , and a row including T/R module elements 440-2A, 440-2B . . . . As will be described more fully below, the first element in each row is considered a master T/R module or TRM, and the remaining TRMs in each row are slave elements. In an exemplary embodiment, the slave BSC 492 sends clock and data signals to each master TRM in each row of each subarray.

Figure 13A:
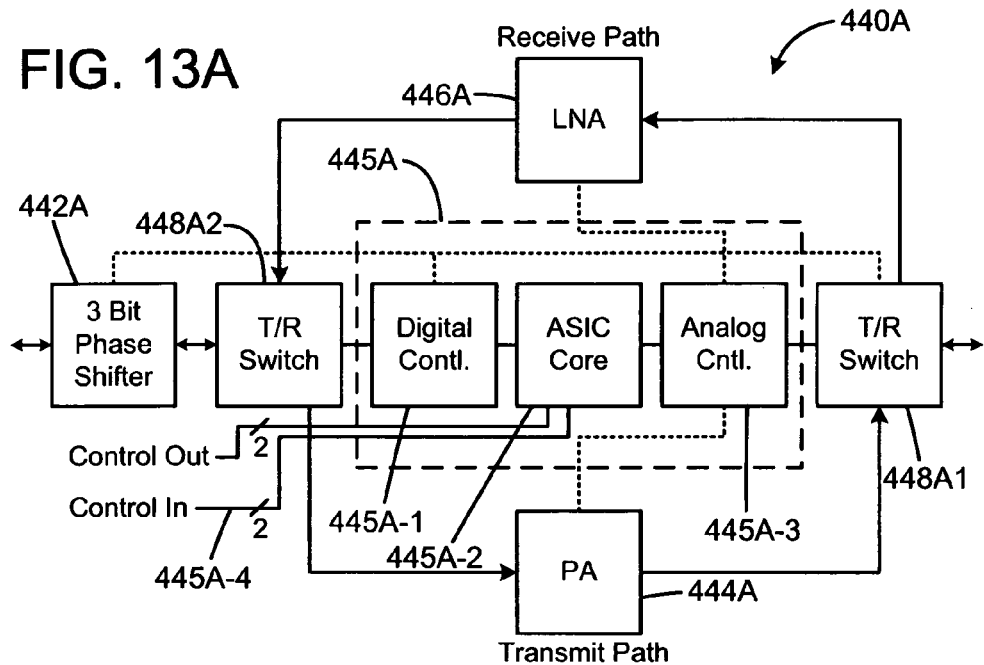
FIG. 13A is a schematic block diagram illustrating an exemplary embodiment of a highly integrated T/R Module Monolithic Microwave Integrated Circuit (MMIC).
Figure 13B:
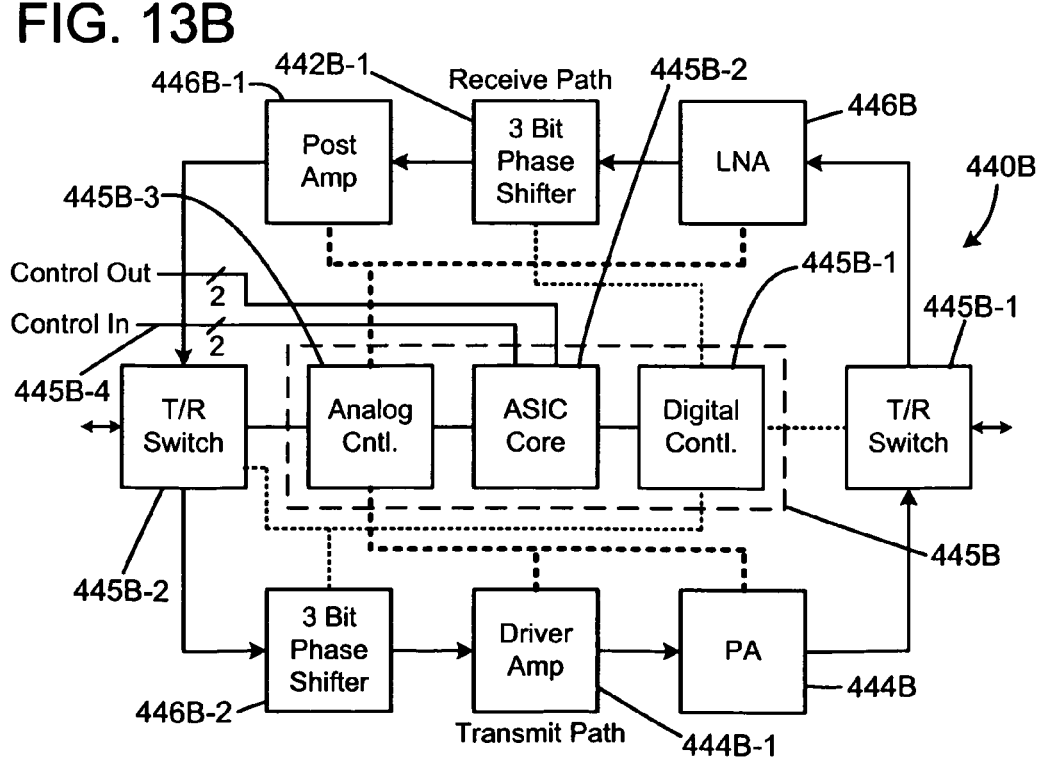
FIG. 13B is a schematic block diagram of an alternative embodiment of a T/R module.

An exemplary embodiment includes an advanced array communication and control architecture of the TR module, employing a serial to serial addressing scheme using a signal pair of control lines containing the clock, data and TR word using Manchester coding. The slave BSC is connected to each master TRM via the signal pair of control lines. In one exemplary non-limiting embodiment, a single chip T/R module may be employed that addresses the challenging requirements in an airship application for microwave performance, low power dissipation, and low cost. An exemplary embodiment of a highly integrated T/R Module Monolithic Microwave Integrated Circuit (MMIC) is illustrated in FIG. 13A, integrating microwave, analog, and digital functions with full T/R module functionality including an on board ASIC to provide the system interface and control of all transmit and receive functions on the chip. An alternative configuration is illustrated in FIG. 13B. While FIGS. 13A and 13B show single channel T/R module chips, multi-channel T/R module chips may also be employed, in which the ASIC controls multiple channels within the chip.

FIG. 13A is a schematic block diagram of a T/R module 440A including a phase shifter 442A, T/R switches 448A1 and 448A2 to select either the transmit path or the receive path, a power amplifier (PA) 444A in the transmit path, and a low noise amplifier (LNA) in the receive path. The module 440A further includes a control function 445A responsive to control signals received at port 445A-4. The control function in an exemplary embodiment may be implemented as an ASIC, with an ASIC core 445A implementing control algorithms, a digital control circuit 445A-1 controlling the phase shifter 442A and the T/R switches, and an analog control circuit 445A-3 controlling the LNA and the PA. In an exemplary embodiment, the control signals include phase slope data and calibration data common to all T/R elements in the array, as will be described further below. In an exemplary embodiment, as described more fully below, each T/R module includes a "control in" line pair, and may include a "control out" line pair. In an exemplary embodiment, the circuit elements shown in FIG. 13A are implemented on a single, mixed signal, integrated circuit chip.

FIG. 13B is a schematic block diagram of an alternate embodiment of a T/R module 440B. This T/R module places phase shifters 442B-1 and 442B-2 in the respective receive and transmit receive paths, in contrast to the arrangement of the embodiment of FIG. 13A, in which a single phase shifter is employed. The module 440B includes T/R switches 448B-1 and 448B-2 to select either the transmit path or the receive path, a power amplifier (PA) 444B in the transmit path with a driver amplifier 444B-1 following the phase shifter 446B-2, and a low noise amplifier (LNA) in the receive path with a post amplifier 446B-1 following the phase shifter 442B-1. The module 440A further includes a control function 445B responsive to control signals received at port 445B-4. The control function in an exemplary embodiment may be implemented as an ASIC, with an ASIC core 445B, a digital control circuit 445B-1 controlling the phase shifters and the T/R switches, and an analog control circuit 445B-3 controlling the amplifiers. In an exemplary embodiment, the control signals include phase slope data and calibration data common to all T/R elements in the array, as will be described further below. In an exemplary embodiment, as described more fully below, each T/R module includes a "control in" line pair, and may include a "control out" line pair. In an exemplary embodiment, the circuit elements shown in FIG. 13B are implemented on a single, mixed signal, integrated circuit chip.

Figure 14A:
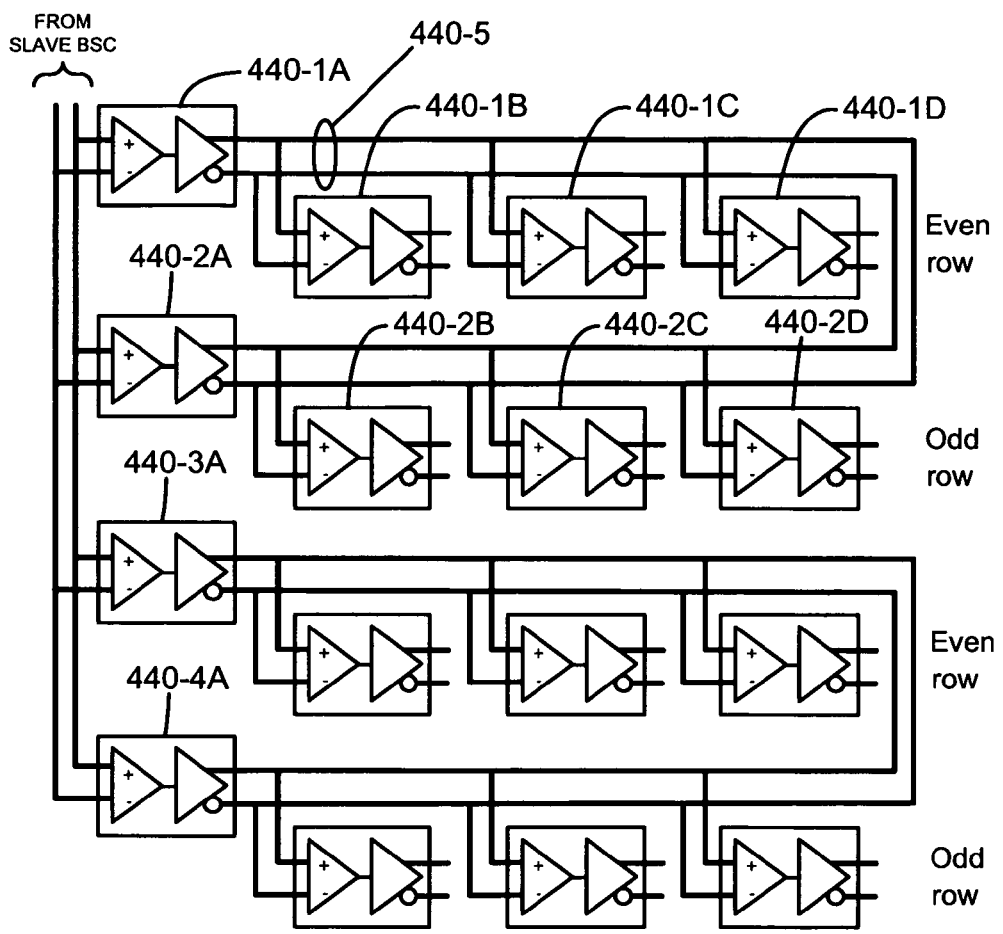
FIG. 14A is a schematic diagram illustrating an exemplary embodiment of an array interface topology.
Figure 14B:
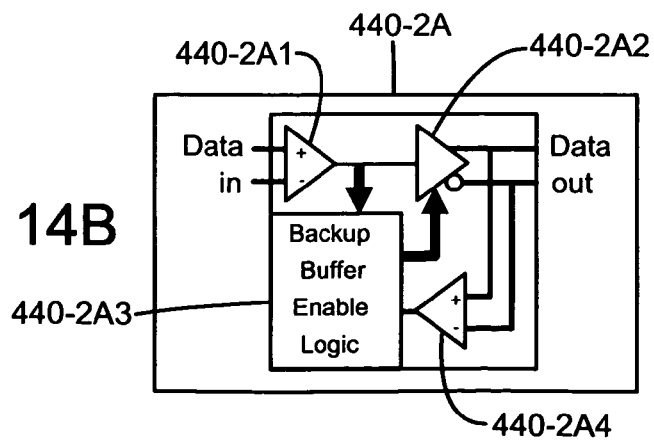
FIG. 14B is a schematic diagram of a circuit for the interface for one T/R in the topology of FIG. 14A.

In an exemplary embodiment, each master T/R element or TRM is connected to the signal pair of control lines from the slave BSC and a distributed control architecture with the T/R elements on the array panel 492 provides a differential buffer repeater for each row of T/R elements in the array. An exemplary embodiment of this topology is illustrated in FIGS. 12A and 14A-14B, and presents a low fan-out to a slave beam steering controller (BSC) 492A that provides the system interface for the typically large number, e.g. several thousand, of elements in a panel array 492. It is low "fan-out" to the system interface to the array, because in an exemplary embodiment, every first TR element in every other row acts as a repeater to the elements in two rows. For example, if each subarray includes 66 rows of T/R elements and each row has 66 T/R elements, the system only drives 33 devices at any given time. In an exemplary embodiment, each repeater buffer can drive a set of T/R elements on two adjacent rows, e.g. in an application with 66 T/R elements per row, 132 T/R elements. Thus, for example, the output lines of master T/R element 440-1A are connected as a differential bus 440-5 to each slave T/R element in the corresponding even row, in this example elements 440-1B, 440-1C and 440-1D, and as well to each slave T/R element in the associated odd row, here elements 440-2B, 440-2C and 440-2D. In addition, the output lines of the even row master element 440-1A are connected to the master T/R element of the associated odd row, here 440-2A. The output drivers in the slave T/R elements are permanently disabled in this embodiment. Redundancy is provided by the master T/R elements in the odd rows, e.g. T/R elements 440-2A and 440-4A (FIG. 14A). The backup master elements in the odd rows sense if the data has propagated around the differential bus 440-5 to which the slave elements in the associated even and odd rows are connected. If the correct data is not detected, the backup master elements will take on the duty of the repeater buffer.

FIG. 14B illustrates an exemplary embodiment of a circuit performing the sense detection as a master T/R element. The exemplary odd row master T/R element 440-2A includes an input control signal receiver 440-2A1 and also a receiver 440-2A2 on its buffered output lines, and both of the receivers' outputs are fed to the backup buffer enable logic 440-2A-3 to check if the buffered output is following the input signal. The drivers in the odd row master T/R elements are normally disabled, but can be activated in the event the output from the even row master T/R element does not follow the input signal on the lines from the slave BSC. The receiver 440-2A4 is a differential line receiver monitoring (sensing) the external wires, to check if the master element of the odd row is following the input signal on the lines from the slave BSC. Whenever the logic of the odd row master T/R module detects that the output (from the even row master T/R module) is not following the input signal, then the master T/R element at the odd row will take over the duty to repeat the signal for both the even and odd rows, and activate its driver. The device 440-2A4 feeds the signal detected from the external wires from the slave BSC back to 440-2A3, the backup buffer enable logic, and it determines if the master element at the odd row is doing the job. In an exemplary embodiment, each T/R module may include the backup enable logic, but only the first module in a row acts as the master element; the rest of the T/R elements in a row are slave elements.

Referring again to FIG. 14A, polarity of the received data is inverted on every odd row to eliminate crossover in the routing, as illustrated in FIG. 14A. The positive output of the driver 440-1A at the top (even) row is tied to the negative output of the 440-2A at the odd row; so the polarity is inverted. Pseudoadiabatic switching may be used to minimize the amount of power needed to drive large capacitive loads. Adiabatic switching is a technique where the energy collected in the parasitic capacitance of the I/Os and interconnections can be reused. Careful shaping of the edge of the pulse may maximize termination resistance values or possibly eliminate the need for it.

Figure 15:
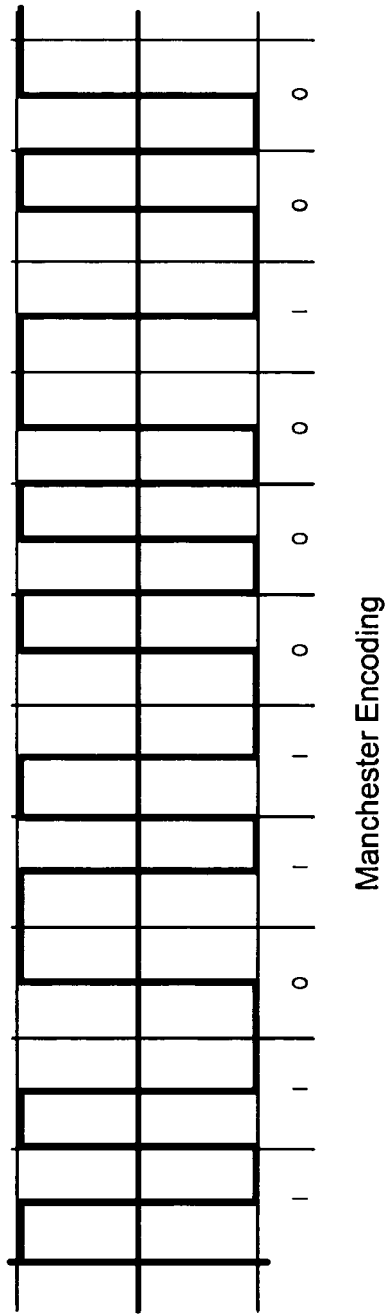
FIG. 15 is an exemplary signal waveform using Manchester encoding on a differential line pair.

Conventional T/R modules require individual differential clock, data, and T/R lines for communication. To minimize weight and routing congestion, an exemplary embodiment of the array architecture employs Manchester encoding, which embeds clock information along with data (FIG. 15). This allows the use of only one set of differential lines to communicate with the T/R elements. The clock/data are combined by the Manchester encoding; thus the signal self-contains the clock information. The positive input of the differential line pair is represented in FIG. 15, and an inverted image will be on the negative input. FIG. 15 shows only the positive input.

As noted above, conventional active array control involves a centralized beam steering computer controlling multiple T/R modules. This involves the bandwidth and power intensive task of sending multiple control architecture individual commands to each T/R module. An exemplary embodiment of a new distributed control architecture uses beam steering functionality embedded in each T/R module to integrate intelligent beam steering logic on each T/R element. General beam steering may be accomplished by multiplying T/R element position within the array with the desired phase slopes. Intrapulse steering for calibration and high range resolution (HRR) may be done with an accumulation process, which provides fast beam resteering within a pulse. The general beam steering has to calculate the specific phase for each T/R module, using phase slope data provided by the centralized computer to each slave BSC, and which is passed along the 2-wire line from the slave BSC to each module in a given panel. The intrapulse steering will be accomplished by each individual T/R module with its own accumulator, and each element updates its phase corresponding to the HRR without receiving commands from central computer. Both modes can be commanded with global commands, greatly reducing control data bandwidth. The general beam steering is controlled by the central computer and the intrapulse steering compensates for the HRR.

Figure 16:
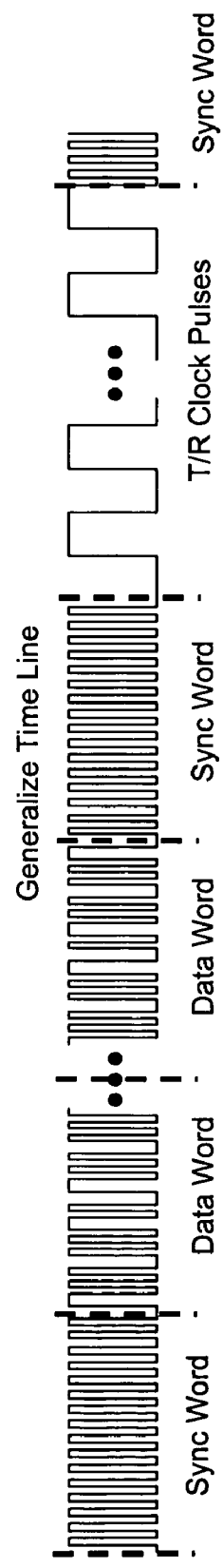
FIG. 16 is an illustrative waveform of a synchronization and data sequence for a T/R module.

FIG. 16 is an illustrative Manchester encoded waveform of the signal propagated by the differential line pair of a data sequence provided to each T/R module in the array. Generally, the Manchester coding has the clock signal embedded in its "return to zero" type of encoding, that bit 0 has the signal transition from one to zero state while bit 1 has the opposite transition. The signal is always in transition at a specific frequency so a PLL will extract the clock signal from this Manchester signal. One more signal (TR, representing the transmit/receive mode command) may be embedded to the existing clock and data signals, and the TR is at a much slower frequency. Each data sequence starts with a synchronization or "sync" word to allow the digital phase lock loop (PLL) circuit of the T/R module ASIC to lock and decode the incoming clock information, followed by a TR data word. The phase slope and other beam steering parameters along with the T/R count are decoded from the data words. In an exemplary embodiment, the same data word being loaded may include data for several beam positions, and as the T/R module executes the data in one data word, another data word is being loaded in and set up. In an exemplary embodiment, the same waveform is provided to all T/R modules of the panel array, i.e. with the same data word. Transmit and receive states of the element are controlled by a T/R clock generated by the T/R module ASIC, in this example. The T/R element will resume looking for data after the T/R clock count has reached a value loaded with the steering data. Embedded error detection codes within the data words and limits on the lock range of the PLL keep data separated in case of loss of synchronization. For an exemplary embodiment, assuming a 10 Megabit data rate and ten 32 bit data words, the time required to steer a beam is 32 μsec or 0.64% of a 5 millisecond beam re-steer rate. For an exemplary non-limiting example, a T/R MMIC chip fabricated with a CMOS technology, the average power needed for the beam steering logic may be less than 25 μW.

Figure 17:
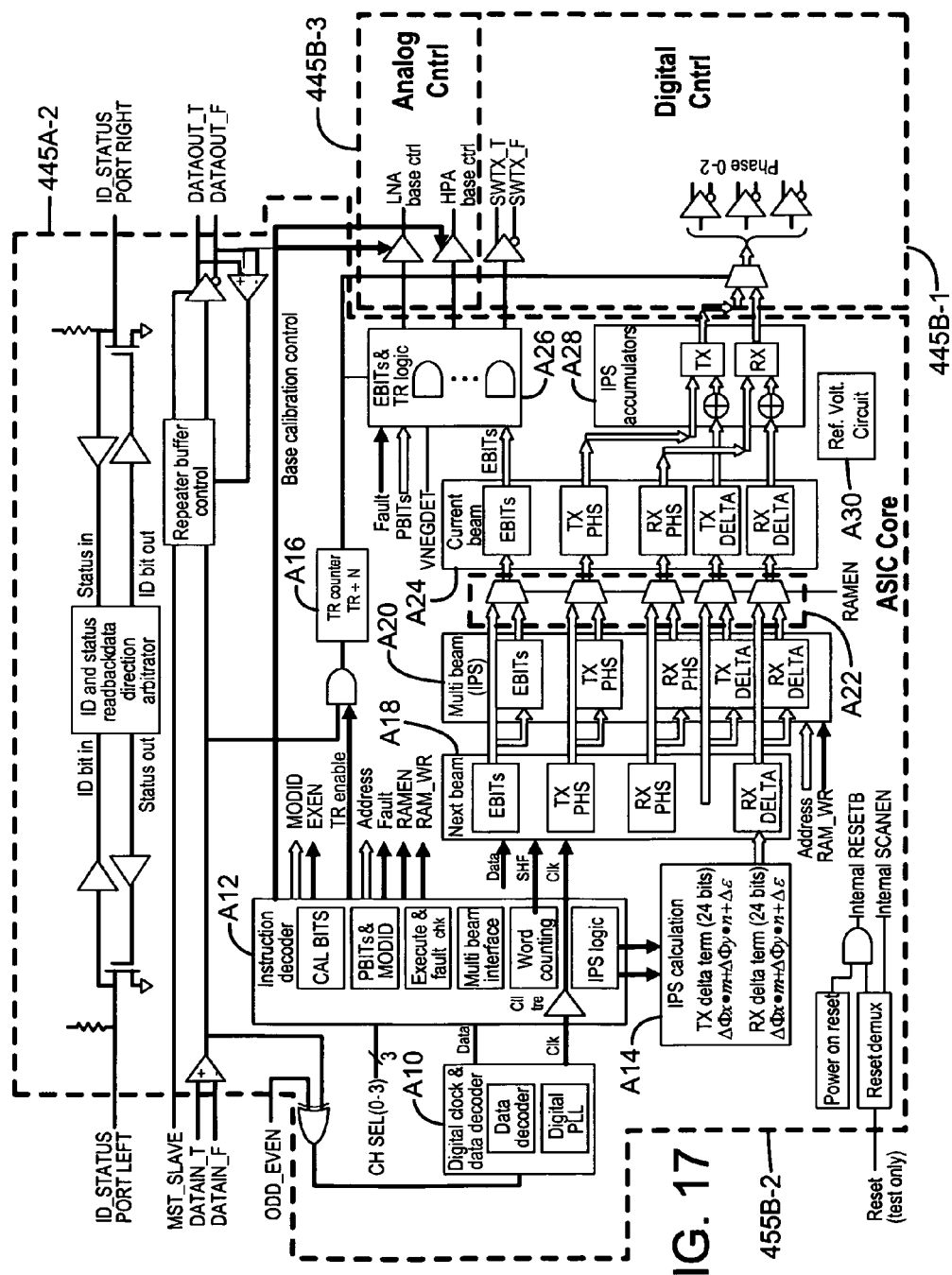
FIG. 17 illustrates an exemplary embodiment of a control logic block diagram for a T/R module.

In an exemplary embodiment, a function of the control logic core 455A-2 (FIG. 13A) or 455B-2 (FIG. 13B) of each T/R module is to provide a serial data interface to the slave BSC 492A. FIG. 17 illustrates an exemplary embodiment of a control logic block diagram of a T/R module 445A for accepting various serial word types to perform the following functions. The core logic 445A-2 includes a digital clock and data decoder block A10, responsive to the data input received on the two line bus from the slave BSC. The decoded data and clock signals are fed to an instruction decoder A12. The instruction decoder implements several functions, including filling up the Next Beam register using the data from the TR words, so it can update the beam, and controlling the RF switch, the HPA and the LNA.

A function of the controller 454A is beam steering. An IntraPulse calculator (IPS) A14 acts on decoded data from the instruction decoder A12 to calculate phase shifter commands from the decoded data and the position (m,n) of the T/R module in the array. In this exemplary embodiment, the ASIC core 454A-2 implements a beam steering algorithm that converts phase slope data to phase settings. A memory retains the values in the Δ∈ term, the calibration terms specific to either temperature, or frequency.

Exemplary algorithms for calculating the transmit and receive settings, (also shown in box A14, FIG. 17), are:

$$TX \text{ delta term} = \Delta\phi x[TX]\cdot m + \Delta\phi y[TX]\cdot n + \Delta\in[TX]$$

$$RX \text{ delta term} = \Delta\phi x[RX]\cdot m + \Delta\phi y[RX]\cdot n + \Delta\in[RX]$$

Here, the m is the x coordinate and n is the y coordinate of the element in an array.

Δϕx, Δϕy are [the phase slopes in X and Y common to all the elements, but TX and RX have different values. The Δ∈ is specific to sections (smaller block) of each panel.

In an exemplary embodiment, the ASIC core 445A-2 of the T/R module controller includes IntraPulse accumulators A28, Next Beam registers A18 and Current beam registers A24. The Next Beam and Current Beam registers are double buffer registers. The Next Beam receiving the incoming (update) beam while the Current Beam controls the existing beam, and the Next Beam can be loaded into the Current Beam at a certain time. The Multi Beam register A20 is a RAM based memory to store beams. The Next Beam registers handle the base beam steering from the corresponding slave BSC, at the background while the Current Beam registers handle the existing beam steering. The ASIC core 454A-2 also controls all the LNA. PA and RF switches through the digital control 454A-1 and analog control 454A-3, based on the commands from the central computer.

The T/R module controller or ASIC 445A includes programmable memory (A22, FIG. 17) to support the beam steering function. This memory is written to prior to beam steering operations. Another function of the controller 445A is diagnostic support, including direct phase control, status readback, and checksum computation.

In an exemplary embodiment, each T/R element has a unique ID to perform the functions described.

The analog control function (445A-3, FIG. 13A or 445B-3, FIG. 13B) provides three major functions: 1) bias generation for the SiGe HBT based LNA and PA functions, 2) bias control for the CMOS phase shifter and switch functions and 3) the CMOS line receiver. For all three functions a stable reference voltage is needed that is tolerant to process, operating temperature and supply voltage variations. Since the PA and LNA will be the largest power dissipaters, their bias should be kept within power budget constraints while maintaining RF performance.

Figure 18:
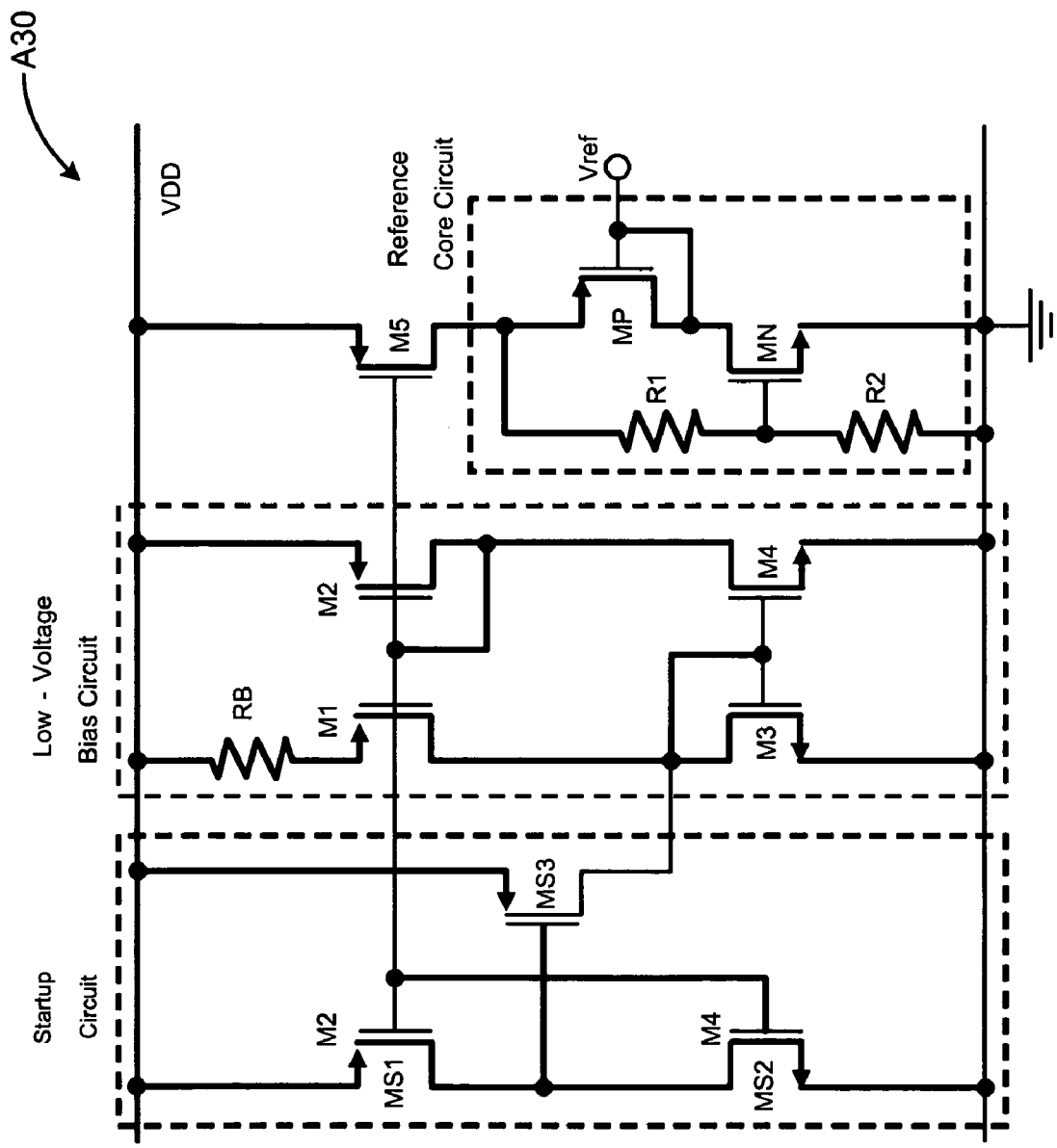
FIG. 18 is a circuit schematic of an exemplary embodiment of a reference voltage circuit.

In an exemplary embodiment, a reference voltage circuit A30 illustrated in FIGS. 17 and 18 is implemented by CMOS-based references that can operate under 1V, and are implemented in the ASIC circuit in an exemplary embodiment. These circuits exhibit similar behavior to a bandgap circuit.

The actual reference voltage is transformed into usable biases for the circuits. Because the circuits that transform the reference voltage and the actual circuits that use the bias both vary with temperature, process, and voltage, the combined effect of all of these components will dictate the power and performance variation each MMIC will exhibit. A compensation scheme may be built into the MMIC that allows the bias to be adjusted if it drifts excessively because of one or more of the variables.

The bias control of the phase shifter circuits and switches is relatively simple because each requires just two voltage states to set its behavior. Because the control feeds gates of NMOS devices, there is only a capacitive load to drive, resulting in essentially no power dissipation.

The CMOS line receiver will dissipate some power because it must remain on at all times and be able to accept the 10 Mbits/s rate. For noise immunity, the lines are differential. To help reduce power dissipation, the differential voltage levels for the line receiver may be designed to be as low as can be tolerated both from a noise immunity standpoint and a line receiver power dissipation standpoint.

Although the foregoing has been a description and illustration of specific embodiments of the subject matter, various modifications and changes thereto can be made by persons skilled in the art without departing from the scope and spirit of the invention as defined by the following claims.

What is claimed is:

1. A distributed control system for an active array antenna system employing at least one set of many transmit/receive (T/R) modules each with an associated radiator element arranged in an array or subarray, a phase shifter element and a set of RF switch elements to set the T/R module to transmit or receive modes, the antenna system arranged to generate a transmit or receive array beam, the control system comprising:
   a processor for controlling the at least one set of T/R modules, the processor configured to propagate command signals to set the T/R module elements to transmit or receive mode and to steer the array beam to a desired direction, and wherein the command signals to steer the array beam include phase slope data common to all T/R modules in said set;
   a beam steering control function implemented in each T/R module, configured to convert said phase slope data to phase data to set the phase shifter element associated with each respective T/R module to a phase shift setting for the beam direction associated with said phase slope data; and
   wherein the array T/R modules are arranged in a plurality of rows, and each row includes a master T/R module and a plurality of slave T/R modules, and the master T/R module for each row receives the command signals from the processor and propagates the command signals on a bus to corresponding slave T/R modules in the row.

2. The system of claim 1, wherein the command signals are provided to the master T/R modules in each row by a signal pair of control lines propagating a clock signal and one or more data words in a data transfer mode.

3. The system of claim 2, wherein the signal pair of control lines is a single differential pair of lines.

4. The system of claim 3, wherein the differential pair of lines is further employed after sending the phase slope data to carry signals to control the T/R module pulsing.

5. The system of claim 4, wherein upon an end of a dwell for a pulse, the different pair of lines revert to a data transfer mode to load data for a next beam.

6. The system of claim 2, wherein each array T/R module including the phase shifter element and the set of RF switch elements is fabricated on a single, mixed signal, integrated circuit chip.

7. The system of claim 1, wherein the plurality of rows are arranged as sets of even and odd rows, and wherein the master T/R module for each even row also propagates the command signals to slave T/R modules in a corresponding odd row on said bus.

8. The system of claim 7, wherein the master T/R module for each odd row is normally disabled from propagating the command signals to the slave T/R modules connected on said bus, and includes logic circuitry to determine an error condition in which the command signals from the processor do not match the signals propagated from the corresponding even row master T/R module, and activates to propagate the command signals to the slave T/R modules on said bus in the odd row and in the corresponding even row.

9. The system of claim 1, wherein the phase slope data includes X and Y direction phase slope data.

10. The system of claim 1, wherein the command signals further include calibration data.

11. The system of claim 1, wherein:
   the at least one set of T/R modules includes at least one subarray set of T/R modules arranged in a subarray on a panel comprising the antenna system:
   the processor is a slave beam steering controller (BSC) responsive to commands from an array central processor to generate said command signals.

12. The system of claim 11, wherein the array system includes a plurality of panels, each with a corresponding slave BSC.

13. The system of claim 11, wherein the at least one subarray set includes a plurality of subarray sets of T/R modules, each arranged to receive said command signals from the slave BSC.

14. The system of claim 1, wherein each T/R module includes an application specific integrated circuit (ASIC), and the ASIC implements said beam steering control function.

15. The system of claim 14, wherein the ASIC is configured to provide a serial data interface to said command signals.

16. An active array antenna system, comprising:
   a plurality of subarray panels, each including one or more subarray sets of transmit/receive (T/R) modules each with an associated radiator element, a phase shifter element and a set of RF switch elements to set the T/R module to transmit or receive modes, and a slave beam steering controller (BSC);
   a central processor for generating control signals to the slave BSCs for the plurality of panels to control operation of the system and generate transmit and received beams in respective transmit and receive modes;
   each of the slave BSCs including a processor for controlling the one or more sets of T/R modules on the respective panel, the processor configured to propagate command signals to set the T/R module elements to transmit or receive mode and to steer the array beam to a desired direction, and wherein the command signals to steer the array beam include phase slope data common to all T/R modules in said at least one set;
   and wherein each T/R module includes a beam steering control function configured to convert said phase slope data to phase data to set the phase shifter element associated with each respective T/R module to a phase shift setting for the beam direction associated with said phase slope data.

17. The system of claim 16, wherein the command signals are provided to the T/R modules by a signal pair of control lines propagating a clock signal and one or more data words in a data transfer mode.

18. The system of claim 17, wherein the signal pair of control lines is a single differential pair of lines.

19. The system of claim 17, wherein the T/R modules of said at least one set are arranged in a plurality of rows, and each row includes a master T/R module and a plurality of slave T/R modules, and the master T/R module for each row receives the command signals from the slave BSC and propagates the command signals on a bus to corresponding slave T/R modules in the row.

20. The system of claim 19, wherein the plurality of rows are arranged as sets of even and odd rows, and wherein the master T/R module for each even row also propagates the command signals on said bus to slave T/R modules in a corresponding odd row.

21. The system of claim 20, wherein the master T/R module for each odd row is normally disabled from propagating the command signals to the slave T/R modules in a corresponding row, and includes logic circuitry to determine an error condition in which the command signals from the processor do not match the signals propagated on said bus from the corresponding even row master T/R module and activates to propagate the command signals to the slave T/R modules in the odd row and in the corresponding even row.

22. The system of claim 16, wherein the phase slope data includes X and Y direction phase slope data.

23. The system of claim 16, wherein the command signals further include calibration data.

24. The system of claim 16, wherein the active array antenna system is mounted on an airship, and the plurality of subarray panels are conformally mounted to a skin of the airship.

\* \* \* \* \*